(12) United States Patent
Chhabra (10) Patent No.: US 9,875,549 B2
(45) Date of Patent: Jan. 23, 2018

(54) CHANGE DETECTION IN VIDEO DATA (75) Inventor: Puneet Singh Chhabra, Bristol (GB)

(73) Assignee: BAE SYSTEMS PLC, London (GB)

( * ) Notice: Subject to any disclaimer, the term of this patent is extended or adjusted under 35 U.S.C. 154(b) by 437 days.

(21) Appl. No.: 13/988,478

(22) PCT Filed: Nov. 7, 2011

(86) PCT No.: PCT/EP2011/069542
§ 371 (c)(1),
(2), (4) Date: May 20, 2013

(87) PCT Pub. No.: WO2012/065872
PCT Pub. Date: May 24, 2012

(65) Prior Publication Data
US 2013/0235198 A1    Sep. 12, 2013

(30) Foreign Application Priority Data

Nov. 18, 2010  (EP) .................................... 10251952
Nov. 18, 2010  (GB) .................................. 1019476.9

(51) Int. Cl.
*H04N 7/18*    (2006.01)
*G06T 7/20*    (2017.01)
*G06T 7/254*   (2017.01)

(52) U.S. Cl.
CPC ................ *G06T 7/20* (2013.01); *G06T 7/254* (2017.01)

(58) Field of Classification Search
CPC ...................................................... G06T 7/20

(Continued)

(56) References Cited

U.S. PATENT DOCUMENTS 4,513,390 A * 4/1985 Walter et al. .................. 345/501
4,679,077 A * 7/1987 Yuasa et al. ................... 348/154
(Continued)

FOREIGN PATENT DOCUMENTS

EP          1 560 160 A2    8/2005
WO    WO 2004/084136 A2    9/2004
(Continued)

OTHER PUBLICATIONS

International Search Report (PCT/ISA/210) dated Feb. 24, 2012, by the European Patent Office as the International Searching Authority for International Application No. PCT/EP2011/069542.
(Continued)

*Primary Examiner* — Leron Beck
(74) *Attorney, Agent, or Firm* — Maine Cernota & Rardin (57) ABSTRACT

A method and apparatus for processing a sequence of images of a scene, includes: a controller; a first module; and a second module; wherein the first module is arranged to perform an image registration process on the sequence to produce a registered set; the second module is arranged to perform a change detection process on the registered set; and the controller is arranged to provide: to the first module, an instruction to perform the image registration process on the sequence to produce the registered set; to the second module, an instruction to perform the change detection process on the registered set; and an instruction to transfer the registered set between the modules. The sequence of images may be a sub-sequence of a larger sequence. The apparatus can include a third module arranged to separate the larger sequence into sub-sequences.

13 Claims, 7 Drawing Sheets

(58) Field of Classification Search
USPC .......................................................... 348/143
See application file for complete search history.

(56) References Cited

U.S. PATENT DOCUMENTS

| | | | |
|---|---|---|---|
| 6,535,114 B1* | 3/2003 | Suzuki | G06T 7/20 340/435 |
| 2002/0167537 A1 | 11/2002 | Trajkovic | |
| 2003/0031318 A1* | 2/2003 | Troyansky et al. | 380/202 |
| 2005/0237390 A1 | 10/2005 | Mittal et al. | |
| 2006/0023782 A1* | 2/2006 | Cai et al. | 375/240.03 |
| 2006/0239537 A1 | 10/2006 | Shragai et al. | |
| 2008/0111881 A1* | 5/2008 | Gibbs et al. | 348/36 |
| 2008/0130744 A1 | 6/2008 | Huang | |
| 2009/0310820 A1 | 12/2009 | Williams | |
| 2010/0238298 A1 | 9/2010 | Ranney et al. | |
| 2011/0025841 A1 | 2/2011 | Cunningham et al. | |

FOREIGN PATENT DOCUMENTS

| | | |
|---|---|---|
| WO | WO 2007/144580 A1 | 12/2007 |
| WO | WO 2007/144620 A2 | 12/2007 |
| WO | WO 2009/003198 A1 | 12/2008 |

OTHER PUBLICATIONS

Written Opinion (PCT/ISA/237) dated Feb. 24, 2012, by the European Patent Office as the International Searching Authority for International Application No. PCT/EP2011/069542.

European Search Report for EP 10251952.7 dated Apr. 5, 2011.

United Kingdom Search Report for GB 1019476.9 dated Apr. 4, 2011.

R. Kumar et al., "Aerial Video Surveillance and Exploitation", Proceedings of the IEEE, dated Oct. 1, 2001, pp. 1518-1539, vol. 89, No. 10.

S. Cheung et al., "Robust Techniques for Background Subtraction in Urban Traffic Video", Visual Communications and Image Processing, dated Jan. 20, 2004, pp. 881-892.

H. Bay et al., "SURF: Speeded Up Robust Features", Proceedings of the $9^{th}$ European Conference on Computer Vision, Springer, LNCS, 3951:404-417, 2006.

D. Lowe, "Distinctive Image Features from Scale-Invariant Keypoints", International Journal of Computer Vision, 2004, pp. 91-110, vol. 60, Issue 2.

C. Stauffer et al., "Adaptive Background Mixture Models for Real-Time Tracking", The Artificial Intelligence Laboratory, 1999, vol. 2, 7 pages.

S. Velastin et al., "Human Intrusion Detection Using Texture Classification in Real-Time", BMVC Workshop on Tracking Humans for the Evaluation of their Motion in Image Sequences, THEMIS, Sep. 2008, pp. 1-18.

B. Horn et al., "Determining Optical Flow", Artificial Intelligence, Aug. 1981, pp. 185-203, vol. 17, No. 1-3.

Notification Concerning Transmittal of International Preliminary Report on Patentability (Forms PCT/IB/326 and PCT/IB/373) and the Written Opinion of the International Searching Authority (Form PCT/ISA/237) dated May 30, 2013, issued in corresponding International Application No. PCT/EP2011/069542. (6 pages).

* cited by examiner

CHANGE DETECTION IN VIDEO DATA

FIELD OF THE INVENTION

The present invention relates to image processing.

BACKGROUND

Change detection algorithms for detecting changes within video feeds are known.

Conventionally, change detection algorithms are used with systems, e.g. Closed-Circuit Television (CCTV) Systems, where the cameras that take the video images are fixed. In such systems, change detection is performed by comparing a current video frame to a learned background image. This technique allows people and vehicles to be detected and tracked.

However, conventional change detection algorithms are not applicable to video data taken with a moving camera. This is because the background image in the video keeps changing, and the perspective of the camera keeps changing.

SUMMARY OF THE INVENTION

In a first aspect the present invention provides apparatus for processing a sequence of images of a scene, the apparatus comprising: a controller; a first module; and a second module; wherein the first module is arranged to perform an image registration process on a sequence of images to produce a registered set of images; the second module is arranged to perform a change detection process on the registered set of images; and the controller is arranged to provide: to the first module, an instruction to perform the image registration process on the sequence of images to produce the registered set of images; to the second module, an instruction to perform the change detection process on the registered set of images; and an instruction that the registered set of images is to be transferred between the first module and the second module.

The sequence of images may be a sub-sequence of a larger sequence of images, the larger sequence of images comprising a plurality of sub-sequences.

The apparatus may further comprise a third module arranged to separate the larger sequence of images into the sub-sequences.

The controller may be further arranged to provide an instruction that a sequence of images is to be transferred between the third module and the first module.

The image registration process may comprise: identifying corresponding image features in the images in the sequence of images; and using the identified image features to estimate homographies from one image in the sequence to another image in the sequence.

The estimation of homographies may be implemented using a Random Sample Consensus process.

The change detection process may comprise: for a particular image in the registered set of images, determining a background image; for a particular pixel in the particular image, determining a value for one or more parameters; for a particular pixel in the background image that corresponds to the particular pixel in the particular image, determining a value for the one or more parameters; and comparing a function of the determined values for the particular image to a further function of the determined values for the background image.

Determining the background image may comprise performing a statistical based process on one or more of the images in the registered set.

The one or more parameters may comprise greyscale intensity of a pixel.

The step of comparing a function of the determined values for the particular image to a further function of the determined values for the background image may comprise determining a difference between the determined values.

The change detection process may further comprise identifying that a change occurred if the determined difference is above a predetermined threshold.

The second module may be further arranged to store a region of an image in which a change is detected.

In a further aspect, the present invention provides a method of processing a sequence of images of a scene, the method comprising: providing to a first module, an instruction to perform an image registration process on a sequence of images to produce a registered set of images; using the first module, performing the image registration process on the sequence of images to produce the registered set of images; transferring between the first module and a second module the registered set of images; providing to the second module, an instruction to perform a change detection process on the registered set of images; and using the second module, performing the change detection process on the registered set of images.

In a further aspect, the present invention provides a program or plurality of programs arranged such that when executed by a computer system or one or more processors it/they cause the computer system or the one or more processors to operate in accordance with any of the above aspects.

In a further aspect, the present invention provides a machine readable storage medium storing a program or at least one of the plurality of programs according to the previous aspect.

DETAILED DESCRIPTION

Figure 1:
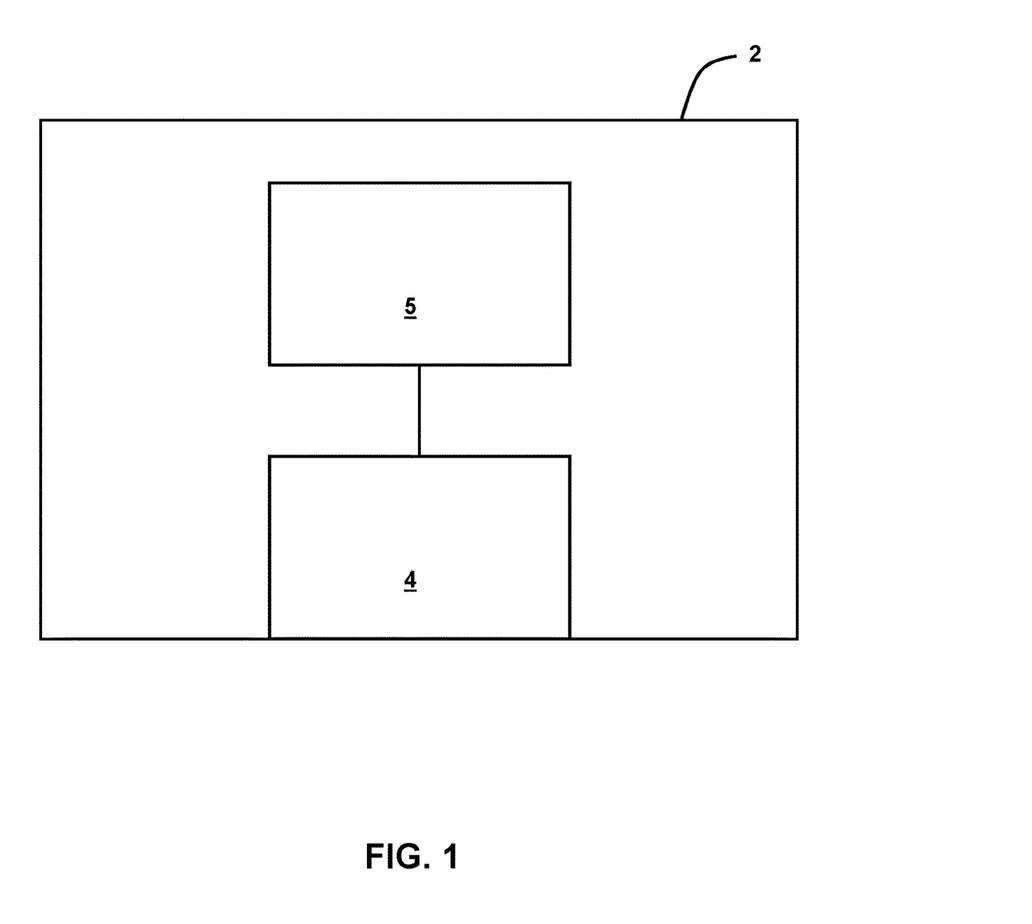
FIG. 1 is a schematic illustration (not to scale) of an aircraft that will be used to implement an embodiment of a change detection system and process.

FIG. 1 is a schematic illustration (not to scale) of an aircraft 2 that will be used to implement an embodiment of a change detection system. In this embodiment the system is implemented in the form of a processor (described in more detail later below with reference to FIG. 3). The processor is used to perform a change detection algorithm (described in more detail later below with reference to FIG. 4).

In this embodiment, the aircraft 2 is an unmanned aircraft. The aircraft 2 comprises a sensor 4 and a processor 5.

In this embodiment, the sensor 4 is a camera. As the aircraft 2 flies in the proximity of an area of terrain, the sensor 4 is arranged to capture high resolution visible band images of the area of terrain, as described in more details later below with reference to FIG. 2. The sensor 4 is coupled to the processor 5.

In this embodiment, data corresponding to the images captured by the sensor 4 is sent from the sensor 4 to the processor 5. The processor 5 is described in more detail later below with reference to FIG. 3. The processor 5 performs a change detection algorithm (described in more detail later below with reference to FIG. 4) on the received data.

Figure 2:
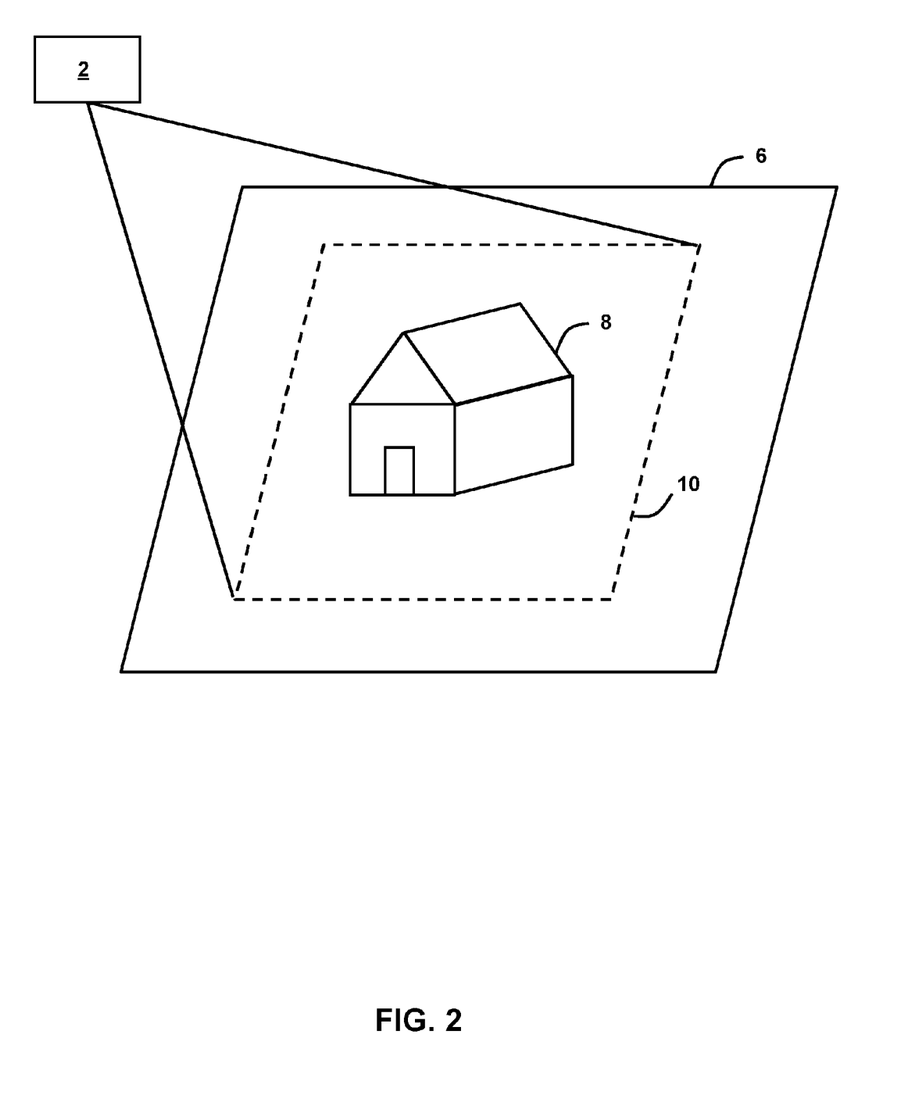
FIG. 2 is a schematic illustration (not to scale) of a scenario in which the aircraft will be used to implement an embodiment of a change detection system and process.

FIG. 2 is a schematic illustration (not to scale) of a scenario in which the aircraft 2 will be used to implement an embodiment of a change detection system and method.

In this scenario, the aircraft 2 flies in the proximity of the area of terrain 6.

In this scenario, the area of terrain 6 comprises a house 8 that is to be kept under surveillance using the aircraft 2, i.e. the aircraft 2 is being used in a surveillance operation being performed on the house 8.

In this scenario, the house 8 is to be kept under surveillance using the aircraft 2 for a pre-determined time period, T. The time period T comprises a plurality of time steps $t_1, \ldots, t_N$.

During the time period T, as the aircraft 2 flies in the proximity of the area of terrain 6 the sensor 4 the aircraft captures an image of the house 8 at each time-step $t_i$, i.e. discrete images are taken of the house 8. However, in other scenarios images are taken of the house by the aircraft continuously.

Thus, in this embodiment, a sequence of images of the house 8 is captured. The sequence of images comprises an image of the house 8 taken at each of the time-steps $t_1, \ldots, t_N$.

Each image of the house 8 taken by the aircraft 2 corresponds to a region of the area of terrain 6. Such a region in the area of terrain 6 is hereinafter referred to as a "scene" and is indicated in FIG. 2 by a dotted line and the reference numeral 10.

The processor 5 implements the change detection algorithm (described in more detail later below with reference to FIG. 3) on data corresponding to the images gathered by the sensor 4. In this embodiment, the change detection algorithm is implemented to facilitate the surveillance operation being performed on the house 8.

Figure 3:
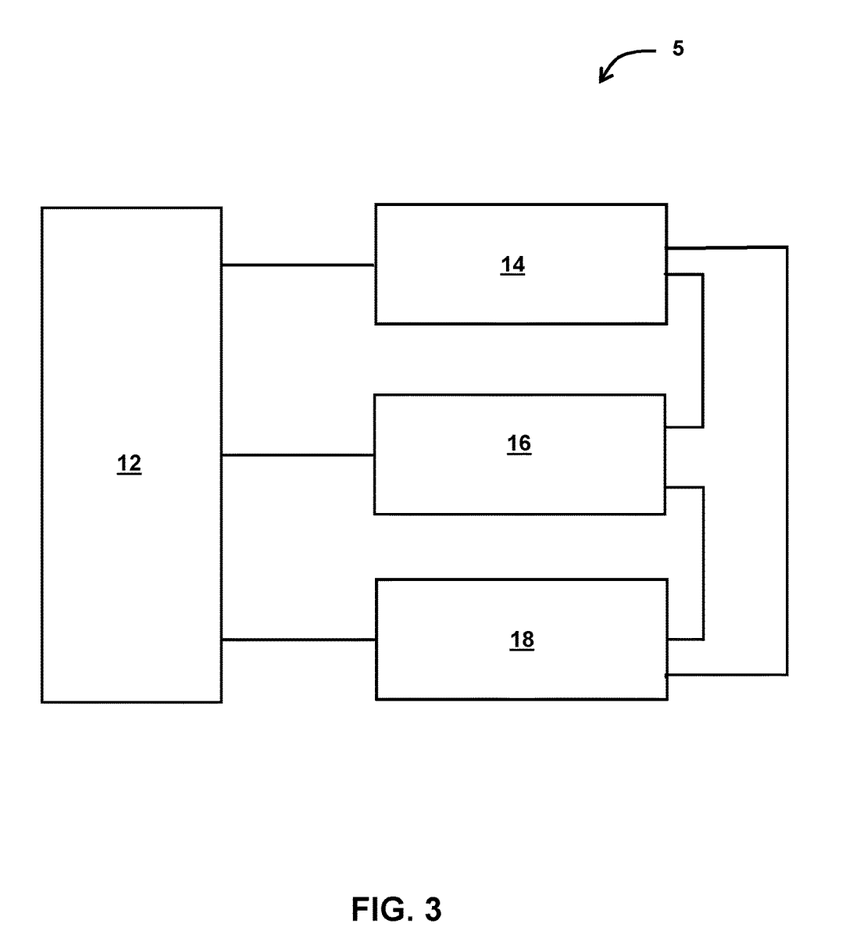
FIG. 3 is a schematic illustration (not to scale) of an embodiment of a processor.

FIG. 3 is a schematic illustration (not to scale) of an embodiment of the processor 5.

In this embodiment the processor 5 comprises a controller 12, a module that may be conveniently called an Input Image Controller module (IIC) 14, a module that may be conveniently called an Input Registration and Mosaicing Module (IrM) 16, and a module that may be conveniently called a Change Detection Module (CDM) 18.

In this embodiment, the controller 12 is coupled to the IIC 14, the IrM 16, and the CDM 18. In particular, the controller 12 is coupled to the modules 14, 16, 18 such that two-way communication between the controller 12 and each module is possible.

In this embodiment, the controller 12 is a module that may be conveniently called a Module Collaborative Controller (MCC).

Figure 4:
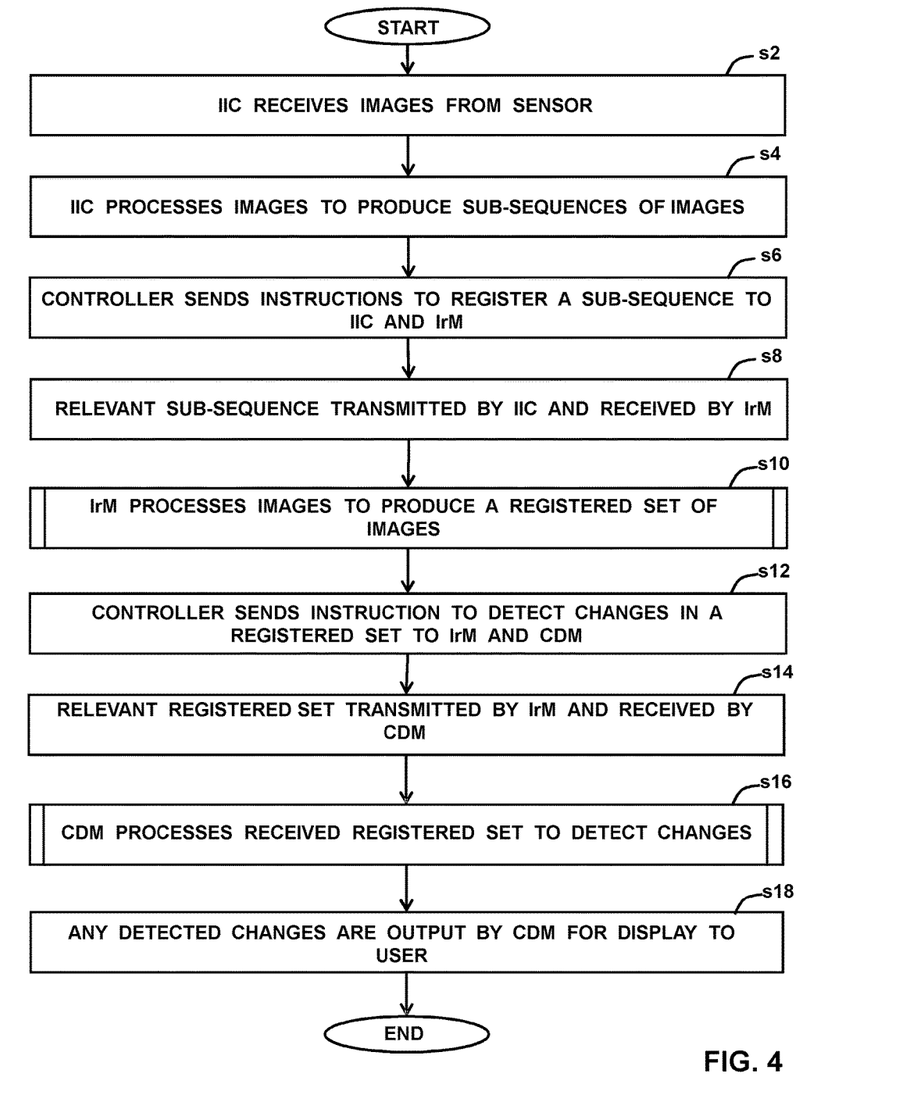
FIG. 4 is a process flow chart showing certain steps of an embodiment of a change detection process.

During operation, the controller 12 manages data transfers (i.e. transfers of module outputs and distribute orders) between the modules 14, 16, 18. Such data transfers are described in more detail later below in the description of the changes detection algorithm (FIG. 4). The controller 12 provides that the modules 14, 16, 18 may operate in parallel as described in more detail later below.

Furthermore, in this embodiment, the controller 12 provides an interface to a user (not shown in FIG. 3) and/or other systems external to the processor 5 and/or aircraft 2. For example, the controller 12 may transmit sequences of images in which changes have been detected (e.g. using the change detection algorithm) to e.g. a base station.

In this embodiment, the controller 12 also provides an interface to the user which allows the user to conduct an evaluation of the modules 14, 16, 18 and, if desired, make improvements to the modules 14, 16, 18.

The controller 12 mainly transmits parameters (or orders) between itself and the modules 14, 16, 18 as opposed to transmitting image content data. This advantageously tends to minimise radio-frequency (RF) bandwidth used by the controller 12.

During operation, the IIC 14 receives the sequence of images from the sensor 4 as the images are captured.

The received images are processed by the IIC 14 as described in more detail later below with reference to FIGS. 4 and 5.

In this embodiment, the IIC 14 is coupled to each of the IrM 16 and the CDM 18. In particular, two-way communication between the IIC 14 and each of the IrM 16 and the CDM 18 is possible. Such communication between the modules 14, 16, 18 tends to allow for the sending and receiving of messages between the modules 14, 16, 18 at regular time intervals.

During operation, the IrM 16 processes images received from the IIC 14, as described in more detail later below with reference to FIGS. 4 and 6. The images are processed by the IrM 16 to produce registered sets of images.

In this embodiment, in addition to being coupled to the IIC 14, the CDM 18 is coupled to the IrM 16 such that two-way communication between the IrM 16 and the CDM 18 is possible.

During operation, the CDM 18 processes the registered sets of images received from the IrM 16. This is done to detect changes in the image sequence resulting from moving objects (i.e. not due to the movement of sensor 4 relative to the house 8 that is under surveillance).

Apparatus, including the processor 5, for implementing the above arrangement, and performing the method steps to be described later below, may be provided by configuring or adapting any suitable apparatus, for example one or more computers or other processing apparatus or processors, and/or providing additional modules. The apparatus may comprise a computer, a network of computers, or one or more processors, for implementing instructions and using data, including instructions and data in the form of a computer program or plurality of computer programs stored in or on a machine readable storage medium such as computer memory, a computer disk, ROM, PROM etc., or any combination of these or other storage media.

FIG. 4 is a process flow chart showing certain steps of an embodiment of a change detection process.

It should be noted that certain of the process steps depicted in the flowchart of FIG. 4 and described below may be omitted or such process steps may be performed in differing order to that presented above and shown in FIG. 4. Furthermore, although all the process steps have, for convenience and ease of understanding, been depicted as discrete temporally-sequential steps, nevertheless some of the process steps may in fact be performed simultaneously or at least overlapping to some extent temporally.

At step s2, the IIC 14 receives images from the sensor 4. In this embodiment, images are received from the sensor 4 as they are captured, i.e. as the sensor 4 gathers the sequence of images, they are sent to the IIC 14.

At step s4, the IIC 14 processes the received images.

In this embodiment, the IIC 14 samples the received image sequence into sub-sequences. In this embodiment, the sequence of images is measured over the time period T, and a sub-sequence of images is those images of the sequence measured over a time interval t, where t is a portion of T.

Figure 5:
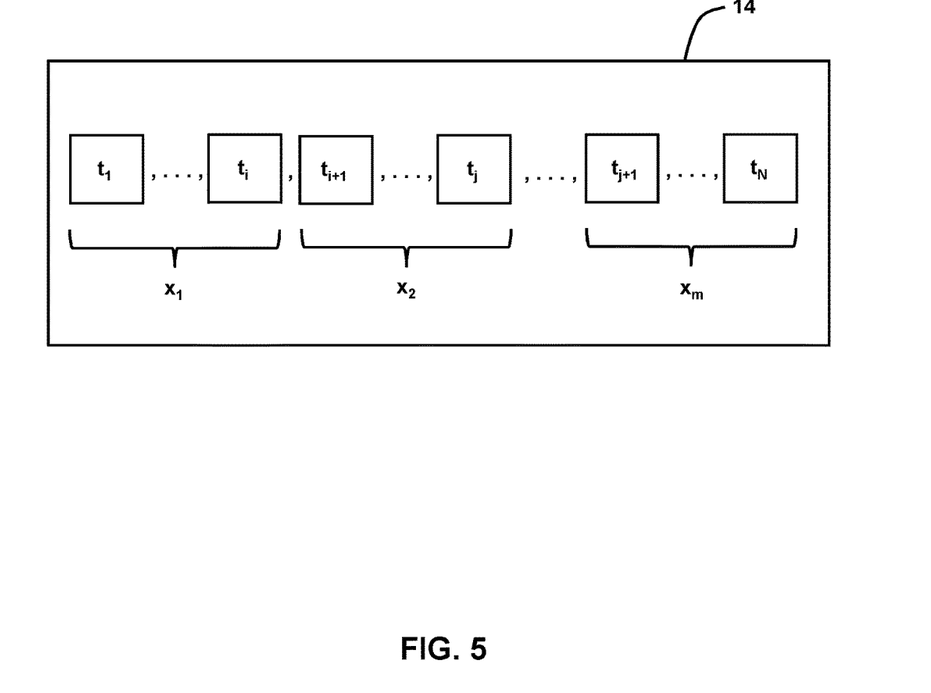
FIG. 5 is a schematic illustration (not to scale) of an Input Image Controller module of the processor of FIG. 4.

FIG. 5 is a schematic illustration (not to scale) of the IIC 14. FIG. 5 shows the sequence of images gathered by the sensor 4 during the time period, T, i.e. the images taken at each of the time-steps $t_1, \ldots, t_N$. Also, indicated in FIG. 5 are the plurality of sub-sequences $x_1, x_2, \ldots, x_m$ that the sequence of images is divided into by the IIC 14 at step s4.

In this embodiment, the IIC 14 groups images to form the sub-sequences as the images are received by the IIC 14. In other words, all of the images in the sequence of images do not need to be received by the IIC 14 before the sub-sequences can be formed. For example, after receiving the images $t_1, \ldots, t_i$, the IIC 14 forms the first sub-sequence $x_1$. This may be done before the IIC receives the image $t_{i+1}$.

At step s6, the controller 12 instructs the IrM 16 to produce a registered set of images from a particular sub-sequence of images (formed as described above at step s4).

In this embodiment, the controller 12 performs this operation by sending an instruction to the IIC 14 to send the relevant sub-sequence to the IrM 16, and by sending an instruction to the IrM 16 to register the received sub-sequence.

At step s8, the relevant sub-sequence is sent from the IIC 14 to the IrM 16. In other words, the IIC 14 performs the instruction it received from the controller 12.

At step s10, the IrM 16 produces a registered set of images from the received sub-sequence of images. In other words, the IrM 16 performs the instruction it received from the controller 12.

The registered set of images is produced by registering each image in the sub-sequence to a reference frame. This tends to compensate for the movement of the sensor 4 relative to the area of terrain 6 during the time period corresponding to the sub-sequence.

In this embodiment, a registered set of images is produced by the IrM 16 by performing an image registration process. The image registration process used in this embodiment is described in more detail later below with reference to FIG. 6. However, in other embodiments a different appropriate process may be used to produce a registered set of images from a sub-sequence.

At step s12, the controller 12 instructs the CDM 18 to detect changes resulting from a moving object in a particular registered set of images (formed as described above at step s10).

In this embodiment, the controller 12 performs this operation by sending an instruction to the IrM 16 to send the registered set of images to the CDM 18, and by sending an instruction to the CDM 18 to perform an image comparison process on the received registered set of images.

At step s14, the relevant registered set of images is sent from the IrM 16 to the CDM 18. In other words, the IrM 16 performs the instruction it received from the controller 12.

At step s16, the CDM 18 performs an image comparison process on the received registered set of images. In other words, the CDM 18 performs the instruction it received from the controller 12.

The image comparison process used in this embodiment is described in more detail later below with reference to FIG. 7. However, in other embodiments a different appropriate process may be used to detect changes in the registered set of images that result from factors other than the movement of the sensor 4 relative to the area of terrain 6 (e.g. by a moving object).

At step s18, some or all of the changes detected by the CDM 18 by performing the image comparison process are output. For example, the changes may be displayed to a user.

Thus, an embodiment of a change detection process for detecting changes in a sequence of images is provided.

Figure 6:
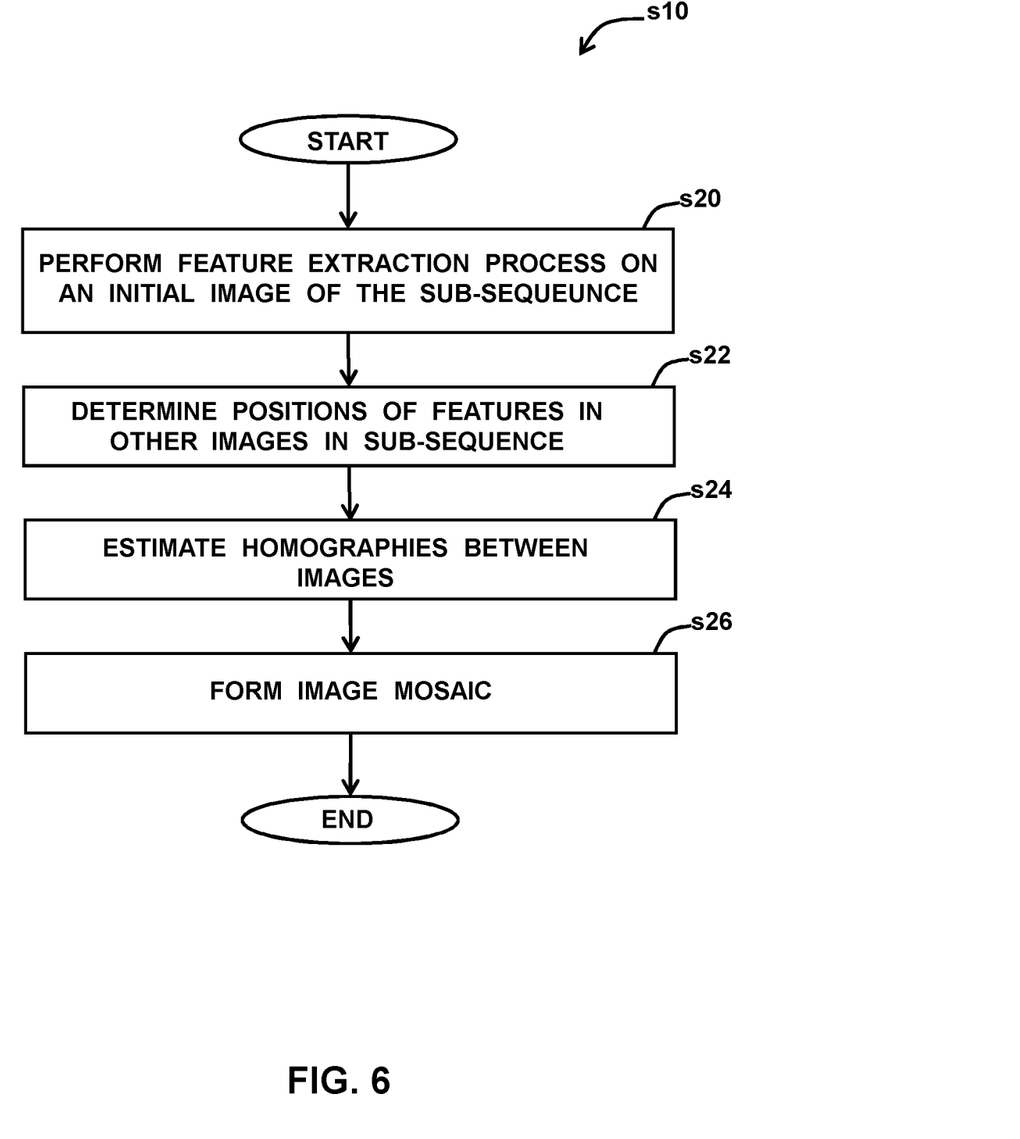
FIG. 6 is a process flow chart showing certain steps of an image registration process.

FIG. 6 is a process flow chart showing certain steps of an image registration process used in this embodiment (at step s10 of the change detection process).

At step s20, a feature extraction process is performed on an initial image in the sub-sequence of images being registered. For example, if the first sub-sequence $x_1$ is to be registered, the feature extraction process is performed on the first image in $x_1$, i.e. the image taken at $t_1$.

The feature extraction process extracts features in the image that tend to be sufficiently distinctive to allow those same features to be identified in the other images of the sub-sequence being registered. For example, in the first sub-sequence $x_1$, the features identified in the image taken at $t_1$ are also identifiable in the images taken at $t_2, t_3, \ldots$ etc.

In this embodiment, the feature extraction process used at step s20 is a Speeded Up Robust Features (SURF) process. An example of such a process is described in "*SURF: Speeded Up Robust Features*", Herbert Bay, Tinne Tuytelaars, and Luc Van Gool, Proceedings of the 9$^{th}$ European Conference on Computer Vision, Springer, LNCS, 3951: 404-417, 2006, which is incorporated herein by reference.

SURF based descriptors exploit integral images to speed up the feature detection process. Thus, SURF processes tend to advantageously outperform other conventional feature extraction techniques.

In other embodiments, a different appropriate feature extraction process is used. For example, in other embodiments a Harris operator may be used to detect corners in the initial image. In other embodiments, the feature extraction process is a Scale Invariant Feature Transform (SIFT) approach, such as that described in "*Distinctive image features from scale-invariant key-points*", David G. Lowe, International Journal Of computer Vision, 60: 91-110, 2004. In other embodiments, a combination of feature extraction process is used.

At step s22, the positions of extracted features (determined at step s20) in each image in the sub-sequence being registered that is subsequent to the initial image are determined.

In other words, at steps s22, in each of the images in the sub-sequence being registered that is subsequent to the initial image, the positions of features corresponding to those extracted from the initial image are determined. In this embodiment, this process is performed using a conventional process.

At step s24, homographies that map one image in the sub-sequence to the next image in the subsequence are estimated. This is performed so that a series of homographies mapping the first image in the sub-sequence to the last image in the sub-sequence is determined, i.e. a homography (or map) is determined between each image and the subsequent images in the sub-sequence.

In this embodiment, a homography is estimated by solving the correspondence between the identified feature points in one image and those points in the next image. In other words, in this embodiment the homographies are estimated from one image to another by computing feature correspondences, i.e. by finding corresponding feature points in two separate images and estimating a projective transformation between those images.

In this embodiment, a homography relating two images is estimated using a Random Sample Consensus (RANSAC) process. However, in other embodiments one or more different process for estimating homographies is used instead of or in addition to the RANSAC process.

At step s26, a mosaic of images, i.e. a registered set of images, is formed using the original images and the estimated homographies. In this embodiment, this process is performed using a conventional process.

Thus, an image registration process is provided.

Figure 7:
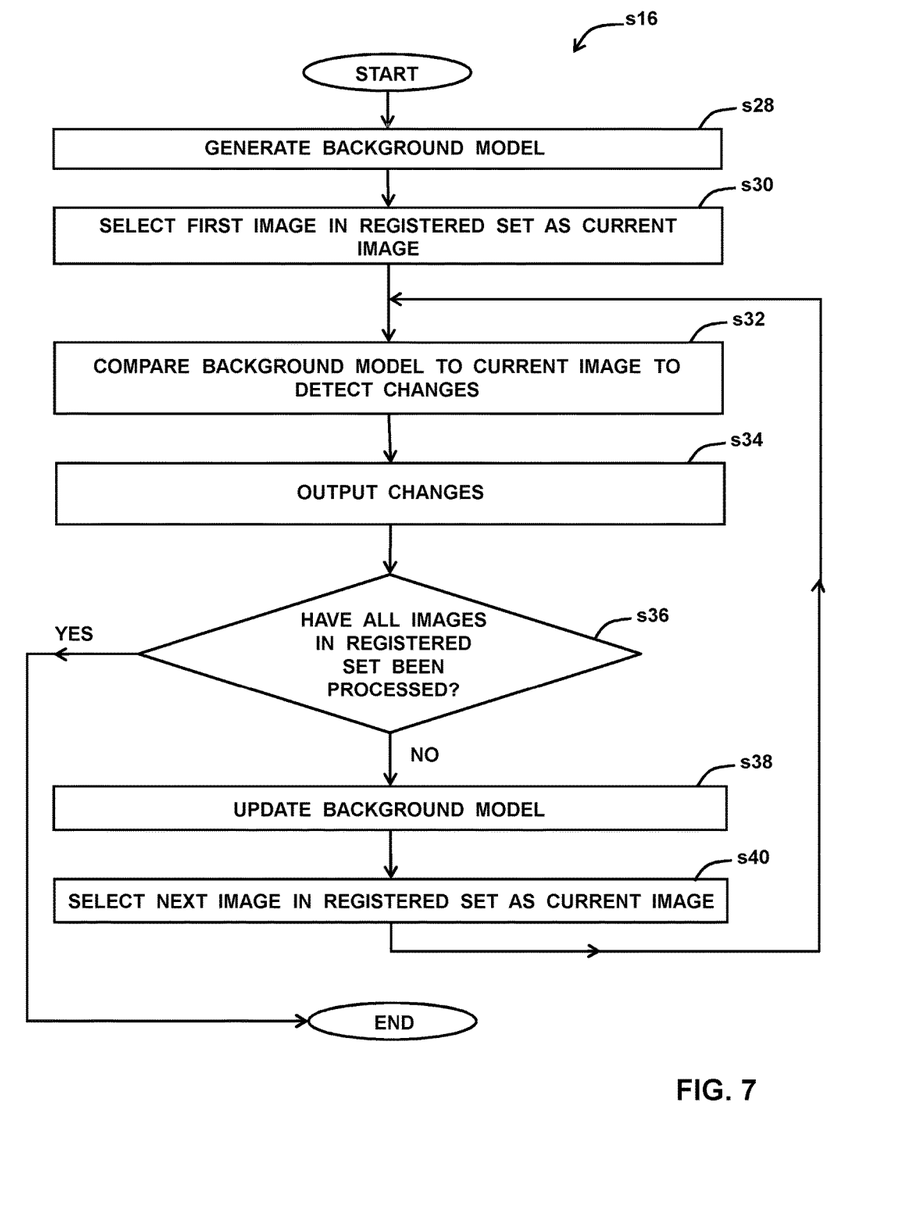
FIG. 7 is a process flow chart showing certain steps of an image comparison process.

FIG. 7 is a process flow chart showing certain steps of an image comparison process used in this embodiment (at step s16 of the change detection process). In this embodiment the image comparison process is performed on a registered set of images.

At step s28, a background model for the registered set of images is produced.

In this embodiment, a statistical background modelling technique is used to determine the background model for the registered set. Statistical background modelling techniques tend to be adaptive to varying illumination and environmental conditions present during the gathering of the images. However, in other embodiments non-statistical methods for background model estimation are used. Examples of background modelling processes are found, for example, in "*Robust techniques for background subtraction in urban traffic video*", S. Cheung, Sen-ching, and Chandrika Kamath, Proc. SPIE 5308, 881, 2004, which is incorporated herein by reference.

At step s30, the first image in the registered set of images being processed is selected as the "current image".

At step s32, the background model and the current image are compared.

In this embodiment, a conventional process of comparing the background image to the current image is performed. In this embodiment, the comparison process includes the steps of (i) converting each image in to greyscale; (ii) for each pixel in the current image, determining a greyscale intensity value of that pixel, and a greyscale intensity value of a corresponding pixel in the background model; (iii) determining a difference of the greyscale intensities of the current image and the background; and (iv) identifying that a significant change has been detected if the difference value is above a pre-determined threshold. In this embodiment, the predetermined threshold is a certain number of standard deviations above the mean greyscale intensity value of the background image.

Also, pixels in which a change has been detected, and which are sufficiently close in the image, are grouped together. If the group is large enough (e.g. it comprises a certain predetermined number of pixels), the group is identified as corresponding to a moving object.

In other words, in this embodiment a statistical method is used to learn the background image model. The mean, standard deviation and rank of the background model is known.

Each pixel in a new image (i.e. a next image in the sub-sequence) is then scored against the learnt background model. If the greyscale intensity of a pixel in the new image is within a certain number of standard deviations of the mean intensity of the corresponding pixel in the background image, a change is not considered to have occurred. However, if the intensity is not within the certain number of standard deviations of the mean intensity of the corresponding pixel in the background image, a change is considered to have occurred. The background image is then updated using the new image.

At step s34, significant differences (i.e. significant changes) between the background model and the current image are output. In this embodiment, the changes are bounded by a bounding box using a conventional method. This bounding box image is then stored for later display to a user. Thus, in this embodiment, only the region of an image containing a change (i.e. a detected object) is stored and/or displayed. In other words, the whole image is not stored. This advantageously tends to reduce computing power required to store and/or transmit changes compared to methods in which the whole of an image is stored and/or transmitted. Also, the number of image frames sent back to the base station tend to be reduced. However, in other embodiments, if a change is detected, the whole image is stored, displayed, and/or transmitted.

At step s36, it is determined whether or not all the images in the registered set have been processed during the image comparison process.

If all the images in the registered set have been processed, the image comparison process finishes.

However, if all the images in the registered set have not been processed, the image comparison process proceeds to step s38.

At step s38, the background model is updated. In this embodiment, the background model is updated in such a way that images that have been compared to the background model (i.e. images that have already been processed during the image comparison process) are fused with the background model, i.e. the background statistics are updated.

The updated background model is considered to be the background model for subsequent steps of the image comparison process.

At step s40, the next image in the registered set of images is selected as the current image.

After step s40, the image comparison process proceeds to step s32.

Thus, the comparison of images with an iteratively updated background model is performed until each image in the registered set has been processed. This process provides that significant changes in any image (resulting from a moving object) of the registered are identified and output.

Thus, an image comparison process is provided.

An advantage provided by the above described system and method for performing change detection is that changes tend to be detectable through an image sequence taken with a moving camera. Thus, problems caused by a constantly shifting background image, i.e. camera jitter and/or drift, and problems caused by changes of perspective of the sensor, tend to be alleviated.

A further advantage provided by the above algorithm is that significant savings in bandwidth, hard disk space, transmission time, and/or operator reviewing time tend to be achievable. These may be achieved by only saving to a hard disk and/or displaying to an operator cropped images that contain a significant change. Also, these advantages may be achieved by the controller sending instructions to the modules of the processor, as opposed to whole sequences of images.

A further advantage provided by the above described algorithm is that the change detection process tends to be robust to tracking noise. This is because the RGB content of an image tends to remain roughly constant in the presence of tracking noise, and only tends to change significantly when an object comes into the image.

A further advantage provided by the above described system is that the processes performed by the controller, the IIC, the IrM, and the CDM may be performed in parallel. For example, the CDM may perform the image comparison process on one set of registered images at the same time that the IrM is performing the image registration process on a different sub-sequence of images. This parallel processing capability tends to advantageously allow for real-time implementation.

A further advantage provided by the above described system is that the system is modular. This tends to provides that the controller and/or any of the modules of the system can be updated, replaced, or changed independently of the other modules of the system.

An advantage provided by the use of feature based image registration is that the effects of camera/sensor jitter and sharp drift tend to be compensated for.

An advantage provided by the parallel processing capability and modularity of the system is that incorporating maintenance, scheduling updates, and adding new modules tend to be facilitated.

A further advantage of the above described system and method is that the modularity of the system tends to allow for the inclusion and implementation of different techniques instead of or in addition to those described above. These different techniques can be advantageously incorporated in to the system using additional (or replacement) modules.

In the above embodiments, the change detection algorithm is implemented using a sensor and processor onboard an unmanned aircraft. However, in other embodiments the sensor and/or processor may be on a different vehicle or entity e.g. a manned aircraft, a land-based vehicle, or as part of a closed-circuit television (CCTV) network. Also, in the above embodiments the sensor and processor may be remote from one another, e.g. the sensor may be a vehicle mounted sensor, and the processor may be from the vehicle e.g. at a ground station. The sensor data may be transmitted to the processor using any appropriate means.

In the above embodiments, the sensor is a camera arranged to capture high resolution visible band images. However, in other embodiments the sensor may be a different appropriate sensor, for example an infrared camera. Moreover, in other embodiments, more than one sensor (of the same type or of different types) may be used.

In the above embodiments, the change detection algorithm is implemented in the scenario described above with reference to FIG. 2. However, in other embodiments the algorithm may be implemented in any appropriate scenario in which the sensor and the region of interest moves relative to each other.

In the above embodiments, a plurality of points is defined in an image of a sub-sequence, which is then tracked through the remaining images in the sub-sequence. These points are then used to estimate a series of homographies between the images. However, in other embodiments, features other than individual points, e.g. one or more regions of interest, may be defined and tracked through the images in the sub-sequence. Moreover, in other embodiments, features may be tracked (and change detected therein) in only part of the sub-sequence.

In the above embodiments, the determination of the positions of feature points in the images of a sub-sequence is implemented using one or more conventional processes as described above. However, in other embodiments, the positions of such feature points within the images of a sub-sequence may determined by implementing one or more different techniques. For example, in other embodiments, feature extraction is performed on an initial image of a sub-sequence. The identified feature points are then tracked throughout the sub-sequence of images, e.g. by implementing a Self Adaptive Discriminant (SAD) Filter (such as that described in WO2007/144580 which is incorporated herein by reference). In other embodiments, a region of interest is tracked through a sub-sequence of images using an appropriate process, e.g. a process of correlation-based matching, or template matching.

In the above embodiments, the change detection process comprises the particular image comparison process described above with reference to step s16. In the above embodiments, the image comparison process comprises an Adaptive Mixture of Gaussian process, such as that described in "*Adaptive background mixture models for real-time tracking*", C. Stauffer and W. E. L. Grimson, volume 2, page 252 Vol. 2, 1999. Such an approach tends to be robust and adaptive to changing environmental conditions. However, in other embodiments, a different appropriate image comparison process is used. For example, in other embodiments the image comparison process comprises an Adaptive Median Filtering process, such as that described in "*Segmentation and tracking of piglets in images*", J B McFarlane and C P Schofield, Machine vision and Applications, 8:187-193, 1995. Such a method tends to work well when the area of terrain is nearly planar, and/or the altitude of the camera is relatively large. In other embodiments the image comparison process comprises a Spatial Texture Descriptor process, such as that described in "*Human intrusion detection using texture classification in real-time*", S. A. Velastin, N. Buch, BMVC Workshop on Tracking Humans for the Evaluation of their Motion in Image Sequences, THEMIS, September 2008. In other embodiments the image comparison process comprises a Dense Optical Flow process, such as that described in "*Determining Optical Flow*", B K P Horn and B G Schunck, Artifical Intelligence, 17(1-3): 185-203, August 1981. In other embodiments, one or more techniques are used in combination to provide at least the functionality described above.

In the above embodiments, at step s32, the background model and the current image are compared using the above described conventional process of comparing the background image to the current image. However, in other embodiments a different process is used. For example, a process including the steps of (i) measuring red, green, and blue (RGB) intensity values for each pixel in each image; (ii) for each pixel in the current image, determining a value indicative of the difference between the RGB value of that pixel, and the RGB value of a corresponding pixel in the background model; (iii) determining a difference of the RGB values of the current image and the background and (iii) identifying that a significant change has been detected is the difference value is above a pre-determined threshold. In other embodiments, a different measure of an image is used. Also, in other embodiments a significant change is identified if the difference metric satisfies some criteria instead of or in addition to the above described criterion of being greater than a predetermined threshold.

In the above embodiments, coordinates of a rectangular bounding box that contains all the detected significant change in an image are determined. However, in other embodiments, no bounding box, or a differently shaped bounding box, is determined.

In the above embodiments, the process of image registration and the image comparison process are performed until all images in a sub-sequence have been processed. However, in other embodiments one or both of these processes may be stopped at any point. For example, a process of change detection may be stopped after the first significant change has been detected.

The invention claimed is:

1. Apparatus for processing a sequence of images of a scene, the apparatus comprising:
   a controller;
   a first module; and
   a second module; wherein
   the first module is configured to perform an image registration process on a sequence of images, wherein the sequence of images is a sub-sequence of a larger sequence of images generated by a moving camera, the larger sequence of images comprising:
a plurality of sub-sequences, to produce a registered set of images;
   the second module is configured to perform a change detection process on the registered set of images; and
the controller is configured to provide:
   to the first module, an instruction to perform the image registration process on the sequence of images to produce the registered set of images;
      to the second module, an instruction to perform the change detection process on the registered set of images; and
      an instruction that the registered set of images is to be transferred between the first module and the second module;
thereby detecting of changes in said larger sequence of images is generated by a moving camera, wherein the change detection process comprises:
   for a particular image in the registered set of images, determining a background image;
   for a particular pixel in the particular image, determining a value for one or more parameters;
for a particular pixel in the background image that corresponds to the particular pixel in the particular image, determining a value for the one or more parameters; and
   comparing a function of the determined values for the particular image to a further function of the determined values for the background image;
   updating said background image by fusing each said particular image in said registered set of images with said background image after comparing a function of the determined values for the particular image to a further function of the determined values for the background image.

2. Apparatus according to claim 1, wherein the apparatus further comprises a third module configured to separate the larger sequence of images into the sub-sequences.

3. Apparatus according to claim 2, wherein the controller is further configured to provide:
   an instruction that a sequence of images is to be transferred between the third module and the first module.

4. Apparatus according to claim 1, wherein the image registration process comprises:

identifying corresponding image features in the images in the sequence of images; and
using the identified image features to estimate homographies from one image in the sequence to another image in the sequence.

5. Apparatus according to claim 4, wherein the estimation of homographies is implemented using a Random Sample Consensus process.

6. Apparatus according to claim 1, wherein determining the background image comprises performing a statistical based process on one or more of the images in the registered set.

7. Apparatus according to claim 1, wherein the one or more parameters comprises greyscale intensity of a pixel.

8. Apparatus according to claim 1, wherein the step of comparing a function of the determined values for the particular image to a further function of the determined values for the background image comprises determining a difference between the determined values.

9. Apparatus according to claim 8, wherein the change detection process further comprises identifying that a change occurred if the determined difference is above a predetermined threshold.

10. Apparatus according to claim 1, wherein the second module is further arranged to store a region of an image in which a change is detected.

11. A method of processing a sequence of images of a scene, the method comprising:
   providing to a first module, an instruction to perform an image registration process on a sequence of images to produce a registered set of images, wherein the sequence of images is a sub-sequence of a larger sequence of images taken with a moving camera, the larger sequence of images comprising: a plurality of sub-sequences;
   using the first module, performing the image registration process on the sequence of images to produce the registered set of images;
   transferring between the first module and a second module the registered set of images;
   providing to the second module, an instruction to perform a change detection process on the registered set of images; and
   using the second module, performing the change detection process on the registered set of images;
   thereby performing change detection in said larger sequence of images taken with a moving camera,
   wherein the change detection process comprises:
      for a particular image in the registered set of images, determining a background image;
      for a particular pixel in the particular image, determining a value for one or more parameters;
   for a particular pixel in the background image that corresponds to the particular pixel in the particular image, determining a value for the one or more parameters; and
   comparing a function of the determined values for the particular image to a further function of the determined values for the background image said background image being updated by fusing each said particular image in said registered set of images with said background image after comparing a function of the determined values for the particular image to a further function of the determined values for the background image.

12. A program or plurality of programs configured such that when executed by a computer system or one or more processors it/they cause the computer system or the one or more processors to operate in accordance with the method of claim 11.

13. A non-transitory computer readable storage medium storing a program or at least one of the plurality of programs according to claim 12.

\* \* \* \* \*